United States Patent
Yeh et al.

(10) Patent No.: US 9,723,241 B2
(45) Date of Patent: Aug. 1, 2017

(54) IMAGE SENSOR CIRCUIT WITH POWER NOISE FILTERING FUNCTION AND CONTROL METHOD THEREOF

(71) Applicant: PixArt Imaging Incorporation, HsinChu (TW)

(72) Inventors: Mei-Chao Yeh, HsinChu (TW); Chien-Jung Chou, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 14/960,178

(22) Filed: Dec. 4, 2015

(65) Prior Publication Data
US 2016/0309099 A1  Oct. 20, 2016

(30) Foreign Application Priority Data
Apr. 20, 2015  (TW) .............. 104112515 A

(51) Int. Cl.
*H04N 5/378* (2011.01)
*H04N 5/361* (2011.01)
*H04N 5/357* (2011.01)

(52) U.S. Cl.
CPC ........... *H04N 5/378* (2013.01); *H04N 5/3577* (2013.01); *H04N 5/361* (2013.01)

(58) Field of Classification Search
CPC ...... H04N 5/378; H04N 5/361; H04N 5/3577; H04N 5/3696; H04N 5/3745
USPC ................................ 348/241, 243
See application file for complete search history.

(56) References Cited

U.S. PATENT DOCUMENTS

| | | | | |
|---|---|---|---|---|
| 6,344,877 B1 * | 2/2002 | Gowda | ................ | H04N 5/3575 250/208.1 |
| 8,975,569 B2 * | 3/2015 | Yamazaki | ............ | H04N 5/3655 250/208.1 |
| 9,148,602 B2 * | 9/2015 | Ha | ........................ | H04N 5/3559 |
| 2005/0088549 A1 * | 4/2005 | Hatano | .................. | H04N 5/217 348/241 |
| 2009/0273691 A1 * | 11/2009 | Mo | ....................... | H04N 5/3559 348/246 |
| 2012/0212657 A1 * | 8/2012 | Mo | ........................ | H04N 5/378 348/300 |

FOREIGN PATENT DOCUMENTS

| | | |
|---|---|---|
| JP | 2005-130322 | 5/2005 |
| JP | 2014-241532 | 12/2014 |

* cited by examiner

*Primary Examiner* — Albert Cutler
(74) *Attorney, Agent, or Firm* — Tung & Associates

(57) ABSTRACT

The present invention provides an image sensor circuit with a power noise filtering function and a control method thereof. The image sensor circuit includes: an image sensing unit, for sensing an image, to generate an image sensed signal; a power noise sensing unit, for sensing a power noise, to generate a power noise signal; a differential amplifier circuit, which is coupled to the image sensing unit and the power noise sensing unit, for receiving the image sensed signal and the power noise signal, to generate a differential filtered signal by a differential amplification operation between the image sensed signal and the power noise signal; and an analog-to-digital converter (ADC) circuit, which is coupled to the differential amplifier circuit, for receiving the differential filtered signal, to generate a digital image signal.

5 Claims, 3 Drawing Sheets

IMAGE SENSOR CIRCUIT WITH POWER NOISE FILTERING FUNCTION AND CONTROL METHOD THEREOF

CROSS REFERENCE

The present invention claims priority to TW 104112515, filed on Apr. 20, 2015.

BACKGROUND OF THE INVENTION

Field of Invention

The present invention relates to an image sensor circuit with a power noise filtering function, and a control method thereof; particularly, it relates to such an image sensor circuit which filters a power noise by way of differential amplification, and a control method thereof.

Description of Related Art

FIG. 1 shows a schematic diagram of a typical complementary metal-oxide-semiconductor (CMOS) image sensor array circuit 1. As shown in FIG. 1, the CMOS image sensor array circuit 1 includes: an image sensor array 2, a row circuit 3, and a column circuit 4, wherein the image sensor array 2 includes plural image sensing units 10. As shown in the figure, the plural image sensing units 10 are arranged in rows and columns, and operate similarly to a digital memory circuit. The row circuit 3 decodes a row position and the column circuit 4 decodes a column position, and the content in the addressed image sensing unit 10 is picked up to generate an analog image signal. An analog-to-digital converter (ADC) circuit (not shown) converts the analog image signal to a digital image signal DIS1. In the column circuit 4, each column includes one ADC circuit to convert the analog image signal to the digital image signal DIS1.

In the prior art, the column circuit 4 first converts the analog image signal to the digital image signal DIS1 by the ADC circuit, and amplifies the digital image signal DIS1 afterward. The aforementioned operation sequence limits the resolution. Besides, the power noise and dark current cancellation are also performed on the digital image signal DIS1. This also degrades the quality of displayed image according to the digital image signal DIS1.

In view of the above, to overcome the drawbacks in the prior art, the present invention proposes an image sensor circuit with power noise filtering function and a control method thereof, which filter the power noise of the analog image signal by a differential amplification operation between the image sensed signal and the power noise signal, before the digital image signal DIS1 is generated.

SUMMARY OF THE INVENTION

From one perspective, the present invention provides an image sensor circuit with a power noise filtering function, including: an image sensing unit, for sensing an image to generate an image sensed signal; a power noise sensing unit, for sensing a power noise to generate a power noise signal; a differential amplifier circuit, which is coupled to the image sensing unit and the power noise sensing unit, for receiving the image sensed signal and the power noise signal, and generating a differential filtered signal by a differential amplification operation between the image sensed signal and the power noise signal; and an analog-to-digital converter (ADC) circuit, which is coupled to the differential amplifier circuit, for receiving the differential filtered signal, to generate a digital image signal, wherein the ADC circuit includes: a comparator, which is coupled to the differential amplifier circuit, for receiving the differential filtered signal to generate a for-count signal; and a counter circuit, which is coupled to the comparator, for converting the for-count signal to the digital image signal.

In one preferable embodiment, the differential amplifier circuit includes: a first sample-and-hold circuit, which is coupled to the image sensing unit, for sampling and storing the image sensed signal; a second sample-and-hold circuit, which is coupled to the power noise sensing unit, for sampling and storing the power noise signal; a differential amplifier, which includes: two differential input terminals, for receiving the image sensed signal and the power noise signal respectively; and two differential output terminals, for providing a voltage difference $\Delta V$ between the two differential output terminals as the differential filtered signal; a third sample-and-hold circuit, which is connected between the differential input terminal for receiving the image sensed signal and one of the differential output terminals; and a fourth sample-and-hold circuit, which is connected between the differential input terminal for receiving the power noise signal and the other differential output terminal.

In the aforementioned embodiment, preferably, each of the first sample-and-hold circuit and the second sample-and-hold circuit has a first capacitor, wherein the first capacitor has a capacitance C1, and each of the third sample-and-hold circuit and the fourth sample-and-hold circuit has a second capacitor, wherein the second capacitor has a capacitance C2, and the voltage difference $\Delta V$ is:

$$\Delta V = \frac{C1}{C2} \times (Vip - Vin)$$

wherein Vin is the voltage of the image sensed signal, and Vip is the voltage of the power noise signal.

In one preferable embodiment, the ADC circuit includes a hysteresis comparator, which includes two hysteresis input terminals coupled to the two differential output terminals respectively, wherein the hysteresis comparator generates the for-count signal according to the voltage difference $\Delta V$, a ramp voltage, and a reference voltage.

In one preferable embodiment, the power noise sensing unit generates the power noise signal by shielding light from the power noise sensing unit or by turning OFF a transfer switch in the power noise sensing unit.

From another perspective, the present invention provides a control method of an image sensor circuit with a power noise filtering function, the method including: sensing an image to generate an image sensed signal; sensing a power noise to generate a power noise signal; receiving the image sensed signal and the power noise signal and generating a differential filtered signal by a differential amplification operation between the image sensed signal and the power noise signal; generating a for-count signal according to the differential filtered signal; and converting the for-count signal to the digital image signal.

In the aforementioned embodiment, the step of receiving the image sensed signal and the power noise signal and generating a differential filtered signal by a differential amplification operation between the image sensed signal and the power noise signal preferably includes: sampling and storing the image sensed signal by a first capacitor which has a capacitance C1; sampling and storing the power noise signal by a second capacitor which has the capacitance C1; receiving the image sensed signal and the power noise signal respectively by two differential input terminals of a differential amplifier; and providing a voltage difference ΔV between two differential output terminals of the differential amplifier as the differential filtered signal; wherein a third capacitor having a capacitance C2, is connected between the differential input terminal for receiving the image sensed signal and one of the differential output terminals; and wherein a fourth capacitor having the capacitance C2, is connected between the differential input terminal for receiving the power noise signal and the other differential output terminal; wherein the voltage difference ΔV is:

$$\Delta V = \frac{C1}{C2} \times (Vip - Vin)$$

wherein Vin is the voltage of the image sensed signal, and Vip is the voltage of the power noise signal.

In one preferable embodiment, the step of receiving the differential filtered signal to generate a for-count signal includes: generating the for-count signal according to the voltage difference ΔV, a ramp voltage, and a reference voltage by a hysteresis comparator, which has two hysteresis input terminals, coupled to the two differential output terminals respectively.

In one preferable embodiment, the step of sensing a power noise to generate a power noise signal includes: generating the power noise signal by shielding light from an image sensing unit of the image sensor circuit or by turning OFF a transfer switch in an image sensing unit of the image sensor circuit.

The objectives, technical details, features, and effects of the present invention will be better understood with regard to the detailed description of the embodiments below.

DESCRIPTION OF THE PREFERRED EMBODIMENTS

Figure 1:
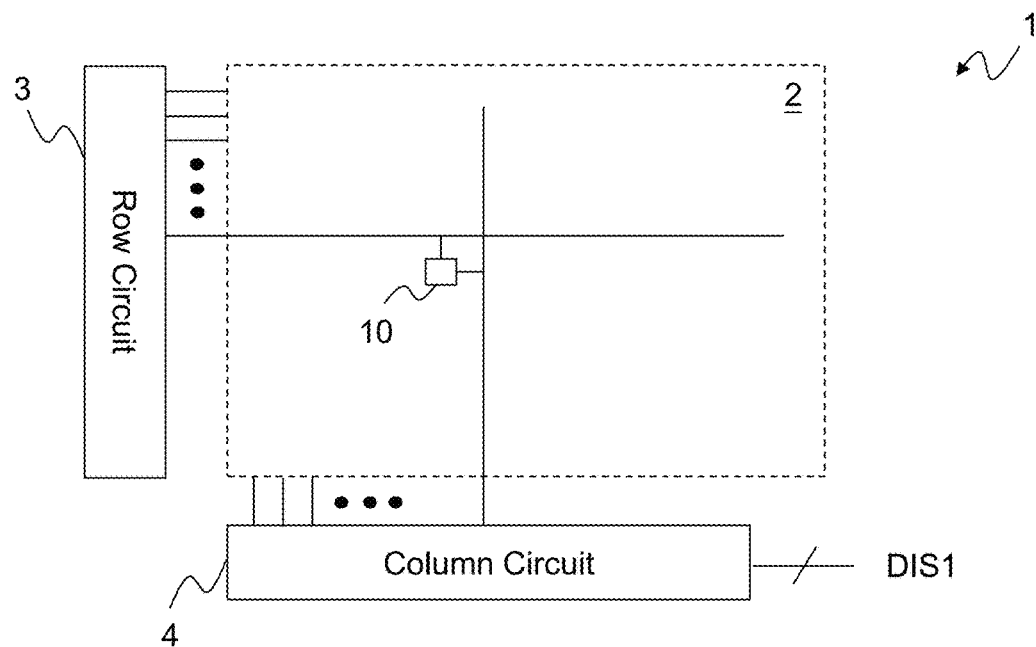
FIG. 1 shows a schematic diagram of a typical CMOS image sensor array circuit 1.
Figure 2:
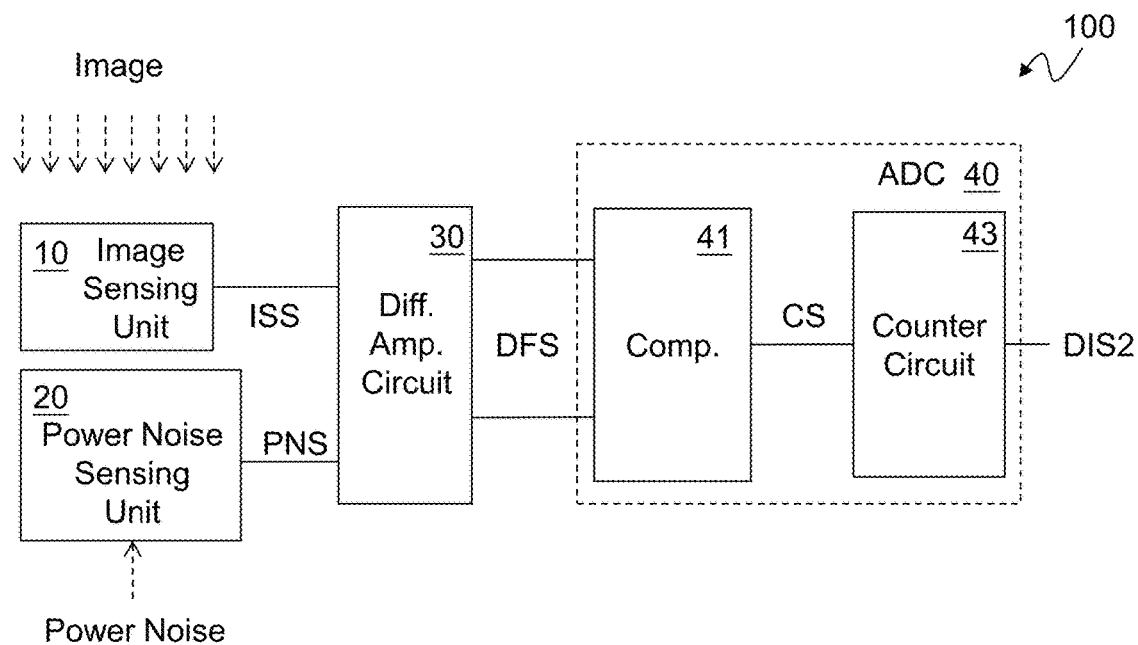
FIG. 2 shows a first embodiment of the present invention.

Please refer to FIG. 2 for a first embodiment according to the present invention. As shown in FIG. 2, an image sensor circuit 100 with a power noise filtering function includes an image sensing unit 10, a power noise sensing unit 20, a differential amplifier circuit 30, and an analog-to-digital converter (ADC) circuit 40. The ADC circuit 40 includes a comparator 41 and a counter circuit 43. The image sensing unit 10 senses an image to generate an image sensed signal ISS. The power noise sensing unit 20 senses a power noise to generate a power noise signal PNS. The differential amplifier circuit 30 is coupled to the image sensing unit 10 and the power noise sensing unit 20, for receiving the image sensed signal ISS and the power noise signal PNS, to generate a differential filtered signal DFS by a differential amplification operation between the image sensed signal and the power noise signal. The ADC circuit 40 is coupled to the differential amplifier circuit 30, for generating a digital image signal DIS2 according to the differential filtered signal DFS. The comparator 41 is coupled to the differential amplifier circuit 30, generating a for-count signal CS according to the differential filtered signal DFS. The counter circuit 43 is coupled to the comparator 41, for converting the for-count signal CS to the digital image signal DIS2.

In this embodiment, the differential amplifier circuit 30 and the ADC circuit 40 for example may be applied in the column circuit 4 of the typical CMOS image sensor array circuit 1, and the image sensing unit 10 and the power noise sensing unit 20 for example may be applied in the image sensor array 2 of the typical CMOS image sensor array circuit 1. The power noise sensing unit 20 for example is provided, one in each column of the image sensor array 2. The present invention is different from the prior art in that, in the first embodiment according to the present invention, the image sensed signal ISS is operated by the differential amplifier circuit 30 before it is converted to the digital image signal DSI2. One advantage of the present invention over the prior art is that, because the image sensor signal ISS is operated by the differential amplifier circuit 30 and the comparator 41 before it is converted to the digital image signal DIS2, the power noise of the analog image sensor signal ISS is filtered by the differential amplification operation between the image sensed signal and the power noise signal. Therefore, the present invention increases the accuracy and resolution of the digital image signal, and reduces the manufacturing cost of a back-end circuit coupled to the output of the image sensor circuit, because the required specification of the back-end circuit is lowered. That is, the present invention removes at least part of the power noise PNS in the image sensed signal ISS, and then amplifies it, such that the amplified signal has a higher resolution in a predetermined range. Therefore, the back-end circuit coupled to the image sensor circuit for processing the digital image signal may be a relatively simpler circuit, which is easier to design, while achieving a higher signal resolution. In one embodiment of the present invention, the power noise sensing unit 20 is for example an image sensing unit, which is shielded from light, such that only the power noise signal PNS is sensed; or, in another embodiment, the power noise sensing unit 20 is for example an image sensing unit of a 4-T image sensor device, wherein a transfer switch thereof is OFF, such that only the power noise signal PNS is sensed. The differential amplifier circuit 30 performs a differential amplification operation between the power noise signal PNS which is generated by the power noise sensing unit 20, and the aforementioned image sensed signal ISS. In the differential amplification operation between the image sensed signal and the power noise signal, the power noise signal PNS can further include information of at least part of a dark current, and such part of the dark current can also be filtered before the image sensed signal ISS is converted to the digital image signal DIS2.

Figure 3:
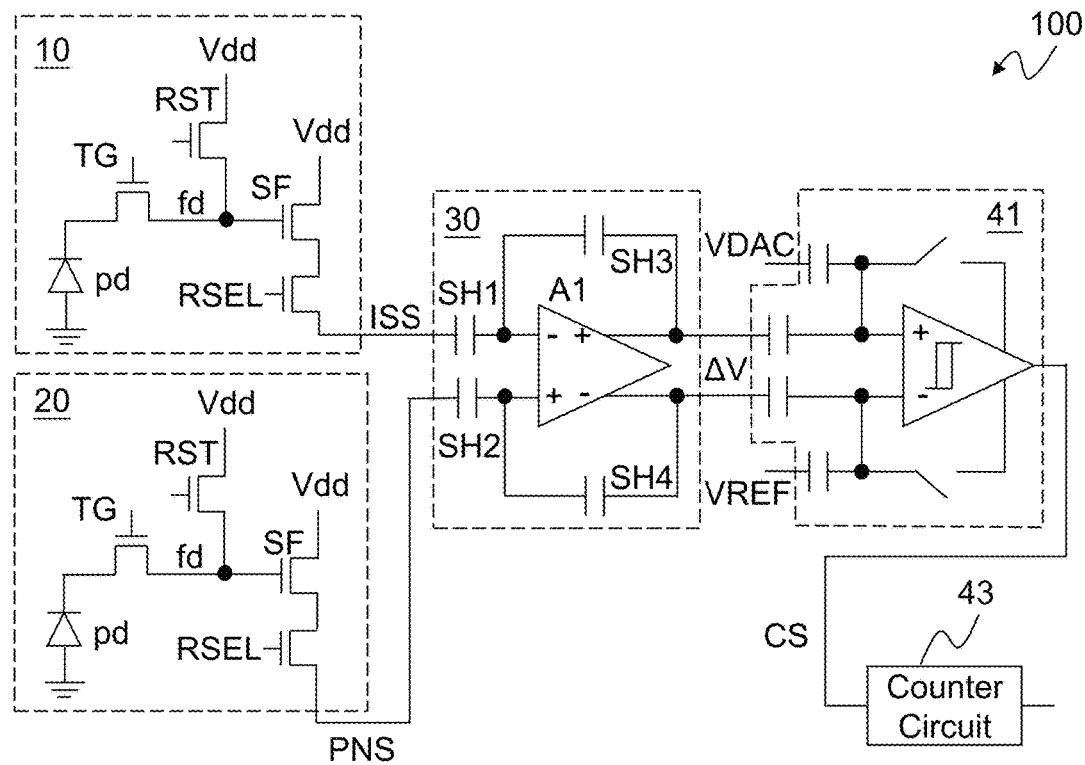
FIG. 3 shows a second embodiment of the present invention.

FIG. 3 shows a second embodiment of the present invention. This embodiment shows a more specific embodiment of the image sensor circuit 100. As shown in FIG. 3, the image sensing unit 10 includes: an image sensor device pd, for example but not limited to a photodiode, a photogate, or a photoconductor, which is configured to receive an image and correspondingly generate and accumulate photo-generated charges; a floating diffusion node fd for storing floating diffusion charges; a transfer gate TG, which is coupled between the image sensor device pd and the floating diffusion node fd, for transferring at least a portion of the photo-generated charges to the floating diffusion node fd as the floating diffusion charges; a reset transistor RST, which is coupled to the floating diffusion node fd in this embodiment, for resetting the floating diffusion node fd to a predetermined level, for example but not limited to an internal voltage level Vdd; a source follower SF, which is coupled to the floating diffusion node fd, for converting the floating diffusion charges to a signal which indicates a pixel image sensed by the image sensor device, wherein the floating diffusion charges stored in the floating diffusion node fd may be expressed in the form of a voltage; and a row selection transistor RSEL coupled to the source follower SF, the row selection transistor RSEL being controlled by a row selection signal, which enables the row selection transistor RSEL to receive the signal and convert the aforementioned pixel image to the image sensed signal ISS.

As shown in FIG. 3, the power noise sensing unit 20 for example has the same structure as the image sensing unit 10, but the transfer gate TG in the power noise sensing unit 20 is kept OFF, or, the image sensor device pd in the power noise sensing unit 20 is shielded from light. The light-shielding for example can be achieved by, in a semiconductor manufacturing process, covering the image sensor device pd by metal or any other non-transparent material, such that the image sensor device pd does not receive an image. More specifically, one embodiment is to keep the transfer gate TG OFF, such that the power noise signal PNS generated by the power noise sensing unit 20 only includes the power noise. Another embodiment is to let the transfer gate TG in the power noise sensing unit 20 be ON, but to shield the image sensor device pd in the power noise sensing unit 20 so that it does not receive an image, whereby the power noise signal PNS includes not only the information about the power noise, but further includes information about at least a part of a dark current, and thus, the at least part of the dark current can be filtered together with the power noise.

As shown in FIG. 3, the differential amplifier circuit 30 includes a differential amplifier A1 and sample-and-hold circuits SH1, SH2, SH3 and SH4. The sample-and-hold circuit SH1 is coupled to the image sensing unit 10, for sampling and storing the image sensed signal ISS. The sample-and-hold circuit SH2 is coupled to the power noise sensing unit 20, for sampling and storing the power noise signal PNS. The differential amplifier A1 has two differential input terminals and two differential output terminals. The two differential input terminals receive the image sensed signal ISS and the power noise signal PNS respectively. The two differential output terminals provide a voltage difference ΔV between the two differential output terminals, as the differential filtered signal DFS. The sample-and-hold circuit SH3 is connected between the differential input terminal for receiving the image sensed signal ISS and one of the differential output terminals. The sample-and-hold circuit SH4 is connected between the differential input terminal for receiving the power noise signal PNS and the other differential output terminal.

The sample-and-hold circuits SH1, SH2, SH3 and SH4 include for example but not limited to capacitors respectively, as shown in the figure. The sample-and-hold circuits SH1, SH2, SH3 and SH4, may further include a reset switch and a reset capacitor, etc. for resetting the stored signal, as well known by those skilled in the art, so details thereof are omitted here. The sample-and-hold circuits SH1, SH2, SH3 and SH4 are for sampling and storing the image sensed signal ISS and the power noise signal PNS, such that the differential amplifier A1 can perform an operation on the image sensed signal ISS and the power noise signal PNS.

Figure 4:
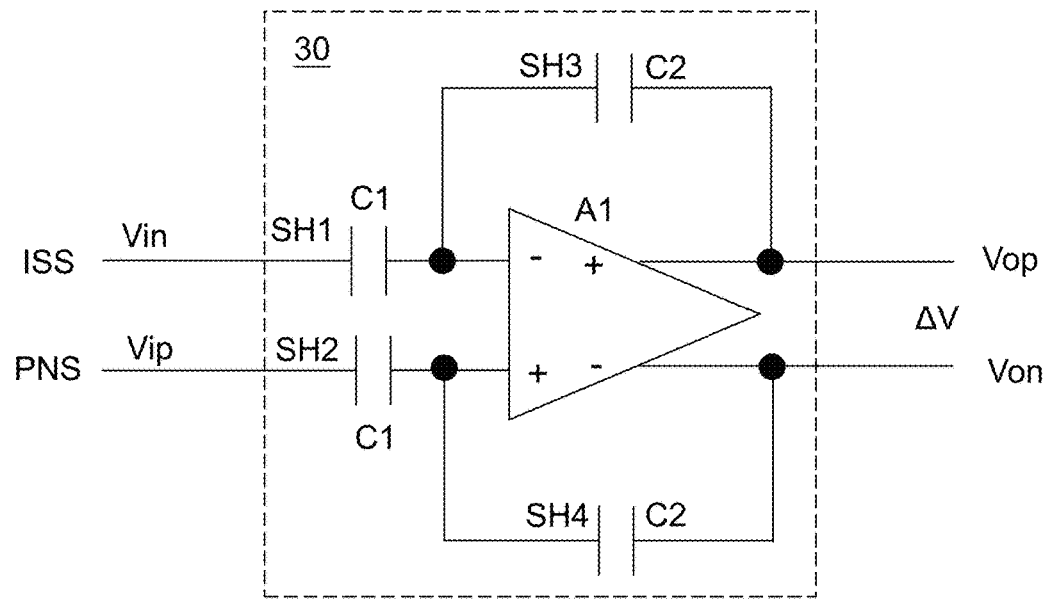
FIG. 4 shows a specific embodiment of a differential amplifier A1 in the second embodiment, which performs an operation on an image sensed signal ISS and a power noise signal PNS.

More specifically, as shown in FIG. 4, each of the sample-and-hold circuits SH1 and SH2 includes a capacitor, wherein the capacitor has a capacitance C1, and each of the sample-and-hold circuits SH3 and SH4 includes a capacitor, wherein the capacitor has a capacitance C2, and the voltage difference ΔV between the two differential output terminals of the differential amplifier A1, which is outputted as the differential filtered signal DFS, is:

$$\Delta V = \frac{C1}{C2} \times (Vip - Vin)$$

wherein Vin is the voltage of the image sensed signal, and Vip is the voltage of the power noise signal. The differential amplifier A1 is used for setting a bias offset by a negative feedback control, such that the differential filtered signal (in this embodiment, the voltage difference ΔV between the two differential output terminals) is a product of the difference between the image sensed signal ISS and the power noise signal PNS multiplied by a ratio of the capacitance C1 to the capacitance C2. Initially, the image sensed signal ISS and the power noise signal PNS generated at an initial timing are stored in the capacitors of the sample-and-hold circuits SH1 and SH2 at the input side respectively, and at the next timing when the image sensed signal ISS and the power noise signal PNS at the next timing are generated, the image sensed signal ISS and the power noise signal PNS at the initial timing are stored in the capacitors of the sample-and-hold circuits SH3 and SH4 at the output side respectively; as such, the ratio of the capacitance C1 to the capacitance C2 is the amplification ratio to amplify the difference between the image sensed signal ISS and the power noise signal PNS, and the amplified signal is the differential filtered signal (the voltage difference ΔV between the two differential output terminals Vop and Von). Note that, in this embodiment, the positive and negative signs of the differential amplifier A1 are interchangeable, as long as ΔV=Vop−Von and the following equation is met:

$$\Delta V = \frac{C1}{C2} \times (Vip - Vin)$$

wherein Vop and Von are the voltages at the two differential output terminals of the differential amplifier A1, and wherein the positive and negative input terminals of the differential amplifier A1 receive the sampled-and-held voltages Vip and Vin respectively.

Figure 5:
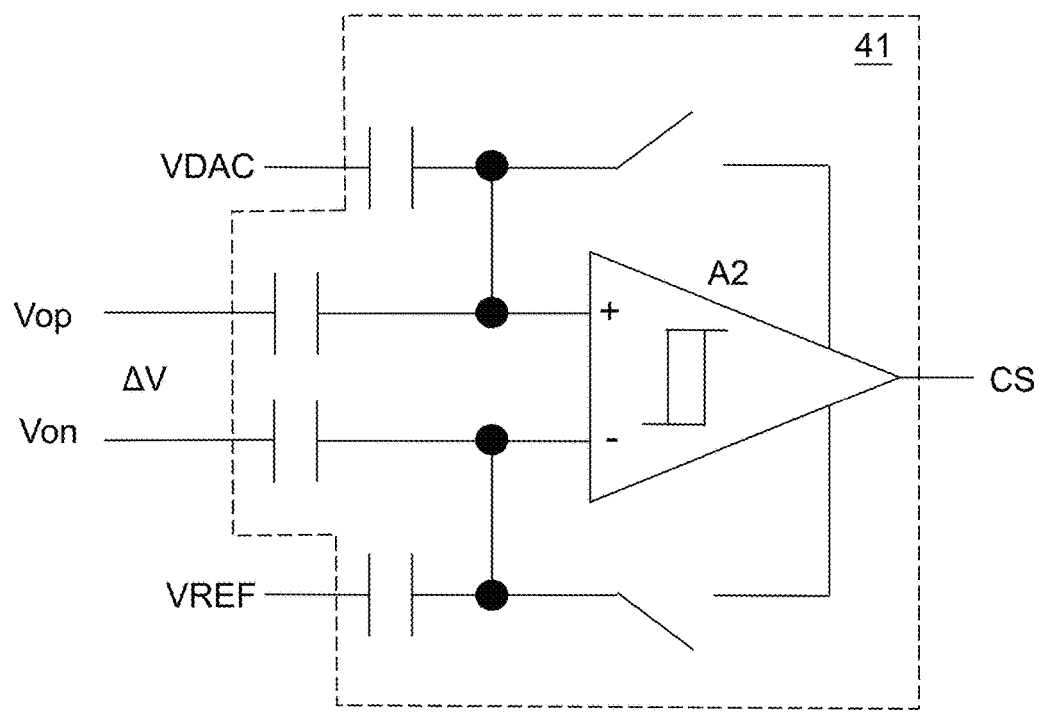
FIG. 5 shows a specific embodiment of a comparator 41 in the second embodiment.

As shown in FIG. 5, the differential filtered signal DFS (the voltage difference ΔV in this embodiment) is a signal between two terminals, and the signal is received by the comparator 41. The comparator 41 includes for example but not limited to a hysteresis comparator A2, which has two hysteresis input terminals, coupled to the two differential output terminals. The comparator 41 generates a for-count signal CS according to the voltage difference ΔV, a ramp voltage VDAC, and a reference voltage VREF. The comparator 41 for example further includes capacitors and switches as shown in the figure. The capacitors are used as divider circuits for obtaining divided voltages at the two hysteresis input terminals of the hysteresis comparator A2 respectively. The switches are used for determining timings of the negative feedback, such that the hysteresis comparator A2 can obtain the for-count signal CS, by performing a differential amplification operation between the two hysteresis input terminals of the hysteresis comparator A2, compensated by the ramp voltage VDAC and the reference voltage VREF.

More specifically, considering that the voltages Vop and Von are:

$$Vop = Vaz + \frac{1}{2}\Delta V$$

$$Von = Vaz - \frac{1}{2}\Delta V$$

respectively, wherein the voltage Vaz is a relative level, which may be considered as an auto-zero level, i.e., a level where the two hysteresis input terminals of the hysteresis comparator A2 is at, when the circuit is at a stable status. The voltage Vaz is given in order to explain the operation, while its actual value is not important here. The primary goal of the circuitry is for the comparator 41 to quantify the voltage difference ΔV, which is the differential filtered signal between two terminals, and convert the voltage difference ΔV to the for-count signal CS at one single terminal. The comparator 41 performs operations on the ramp voltage VDAC with the voltage Vop, and the reference voltage VREF with the voltage Von, respectively. In one embodiment, at the positive hysteresis input terminal of the hysteresis comparator A2, the ramp voltage VDAC counts downward to the voltage Vop, i.e., to reach the voltage Vaz+½ΔV; and at the negative hysteresis input terminal of the hysteresis comparator A2, the reference voltage VREF counts upward to the voltage Von, i.e., to reach the voltage $$Vaz - \frac{1}{2}\Delta V.$$

In another embodiment, the reference voltage VREF has a constant level, and the ramp voltage VDAC has a descending level with a constant negative slope; the capacitors forming divider circuits, with the two hysteresis input terminals at the voltage divider nodes, such that the for-count signal CS generated at one single terminal can indicate a value of the differential filtered signal DFS between two terminals, i.e., the voltage difference ΔV. The counter circuit 43 shown in FIG. 2 converts the for-count signal CS to the digital image signal DIS2. The counter circuit 43 generates the digital image signal DIS2 by counting the time during which the hysteresis comparator A2 obtains the for-count signal CS, i.e., the time for the voltage divider nodes to reach the voltage $$Vaz + \frac{1}{2}\Delta V$$

and the voltage $$Vaz - \frac{1}{2}\Delta V,$$

or by counting other signals when can indicate the transition from the voltage Vaz to the voltage $$Vaz + \frac{1}{2}\Delta V$$

and the voltage $$Vaz - \frac{1}{2}\Delta V$$

at the two hysteresis input terminals.

Figure 6:
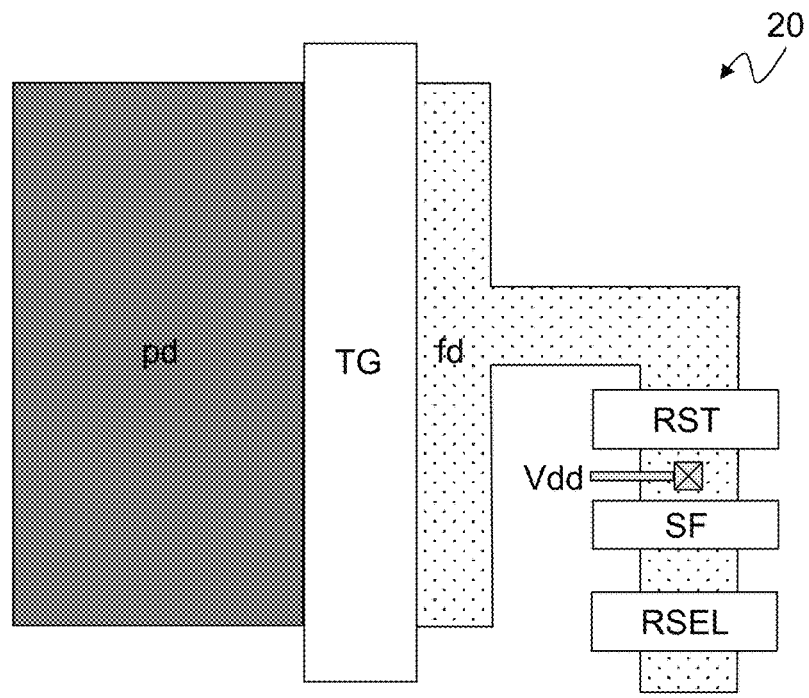
FIG. 6 shows a third embodiment of the present invention.

FIG. 6 shows a third embodiment of the present invention. This embodiment shows a schematic top-view of an example of the power noise sensing unit 20. As shown in FIG. 6, the image sensor device pd is for example but not limited to a photodiode, and is for example but not limited to having a rectangle shape from the top-view. The transfer gate TG, the diffusion node fd, the reset transistor RST, the source follower SF, and the row selection transistor RSEL are arranged by the layout as shown in the top-view of FIG. 6. The image sensor device pd is dark, indicating that the image sensor device pd is covered by a non-transparent material, for generating the power noise signal PNS. As explained in the above, another embodiment is to keep the transfer gate OFF, to generate the power noise signal PNS.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit that does not influence the main meanings of signals, such as a switch or a logic operation circuit, can be inserted between two devices or circuits that are shown to be in direction connection in the embodiments. For another example, the image sensor device is not limited to having an array of the rectangle shape; the array may be arranged in any other shapes and numbers. In view of the foregoing, the spirit of the present invention should cover all such and other modifications and variations, which should be interpreted to fall within the scope of the following claims and their equivalents. Further, an embodiment or a claim of the present invention does not need to achieve all the objectives or advantages of the present invention. The title and abstract are provided for assisting searches but not for limiting the scope of the present invention.

What is claimed is:

1. An image sensor circuit with a power noise filtering function, comprising:
    an image sensing unit, for sensing an image to generate an image sensed signal;
    a power noise sensing unit, for sensing a power noise to generate a power noise signal;
    a differential amplifier circuit, which is coupled to the image sensing unit and the power noise sensing unit, for receiving the image sensed signal and the power noise signal, and generating a differential filtered signal by a differential amplification operation between the image sensed signal and the power noise signal; and
    an analog-to-digital converter (ADC) circuit, which is coupled to the differential amplifier circuit, for receiving the differential filtered signal, to generate a digital image signal,
    wherein the ADC circuit includes:

a comparator, which is coupled to the differential amplifier circuit, for receiving the differential filtered signal to generate a for-count signal; and a counter circuit, which is coupled to the comparator, for converting the for-count signal to the digital image signal;

wherein the differential amplifier circuit includes:

a first sample-and-hold circuit, which is coupled to the image sensing unit, for sampling and storing the image sensed signal;

a second sample-and-hold circuit, which is coupled to the power noise sensing unit, for sampling and storing the power noise signal;

a differential amplifier, which includes:

two differential input terminals, for receiving the image sensed signal and the power noise signal respectively; and two differential output terminals, for providing a voltage difference ΔV between the two differential output terminals as the differential filtered signal;

a third sample-and-hold circuit, which is connected between the differential input terminal for receiving the image sensed signal and one of the differential output terminals; and a fourth sample-and-hold circuit, which is connected between the differential input terminal for receiving the power noise signal and the other differential output terminal;

wherein the ADC circuit includes a hysteresis comparator, which includes two hysteresis input terminals coupled to the two differential output terminals respectively, wherein the hysteresis comparator generates the for-count signal according to the voltage difference ΔV, a ramp voltage, and a reference voltage.

2. The image sensor circuit of claim 1, wherein each of the first sample-and-hold circuit and the second sample-and-hold circuit has a first capacitor, wherein the first capacitor has a capacitance C1, and each of the third sample-and-hold circuit and the fourth sample-and-hold circuit has a second capacitor, wherein the second capacitor has a capacitance C2, and the voltage difference ΔV is:

$$\Delta V = \frac{C1}{C2} \times (Vip - Vin)$$

wherein Vin is the voltage of the image sensed signal, and Vip is the voltage of the power noise signal.

3. The image sensor circuit of claim 1, wherein the power noise sensing unit generates the power noise signal by shielding light from the power noise sensing unit or by turning OFF a transfer switch in the power noise sensing unit.

4. A control method of an image sensor circuit with a power noise filtering function, the method comprising:

sensing an image to generate an image sensed signal;

sensing a power noise to generate a power noise signal;

receiving the image sensed signal and the power noise signal and generating a differential filtered signal by a differential amplification operation between the image sensed signal and the power noise signal;

generating a for-count signal according to the differential filtered signal; and converting the for-count signal to a digital image signal;

wherein the step of receiving the image sensed signal and the power noise signal and generating a differential filtered signal by a differential amplification operation between the image sensed signal and the power noise signal includes:

sampling and storing the image sensed signal by a first capacitor which has a capacitance C1;

sampling and storing the power noise signal by a second capacitor which has the capacitance C1;

receiving the image sensed signal and the power noise signal respectively by two differential input terminals of a differential amplifier; and providing a voltage difference ΔV between two differential output terminals of the differential amplifier as the differential filtered signal;

wherein a third capacitor having a capacitance C2, is connected between the differential input terminal for receiving the image sensed signal and one of the differential output terminals; and wherein a fourth capacitor having the capacitance C2, is connected between the differential input terminal for receiving the power noise signal and the other differential output terminal;

wherein the voltage difference ΔV is:

$$\Delta V = \frac{C1}{C2} \times (Vip - Vin)$$

wherein Vin is the voltage of the image sensed signal, and Vip is the voltage of the power noise signal;

wherein the step of generating a for-count signal according to the differential filtered signal includes: generating the for-count signal according to the voltage difference ΔV, a ramp voltage, and a reference voltage by a hysteresis comparator, which has two hysteresis input terminals, coupled to the two differential output terminals respectively.

5. The control method of claim 4, wherein the step of sensing a power noise to generate a power noise signal includes: generating the power noise signal by shielding light from an image sensing unit of the image sensor circuit or by turning OFF a transfer switch in an image sensing unit of the image sensor circuit.

* * * * *